United States Patent
Puletti et al.

[11] Patent Number: 5,865,927
[45] Date of Patent: Feb. 2, 1999

[54] PROCESS FOR COATING HOT MELT ADHESIVES

[75] Inventors: Paul Puletti, Pittstown; Stephen Hatfield, Somerville, both of N.J.

[73] Assignee: National Starch and Chemical Investment Holding Corporation, Wilmington, Del.

[21] Appl. No.: 826,991

[22] Filed: Feb. 24, 1997

Related U.S. Application Data

[63] Continuation of Ser. No. 269,402, Jun. 30, 1994, abandoned.

[51] Int. Cl.$^6$ .................................................. B29C 47/00
[52] U.S. Cl. .............. 156/244.11; 264/178; 264/177.17; 264/211.2; 264/210.3; 427/372.2; 427/374.1; 427/374.4; 427/384; 427/374.2
[58] Field of Search ............................ 427/372.2, 374.1, 427/374.4, 384, 422, 374.2; 264/211.2, 210.3, 177.17, 178

[56] References Cited

U.S. PATENT DOCUMENTS

| | | | |
|---|---|---|---|
| 2,639,808 | 5/1953 | Barry et al. ................................. | 206/84 |
| 3,941,866 | 3/1976 | Ingraham et al. ........................ | 264/135 |
| 4,054,632 | 10/1977 | Franke ..................................... | 264/145 |
| 4,334,615 | 6/1982 | Butler et al. .............................. | 206/447 |
| 4,681,712 | 7/1987 | Sakakibara et al. ....................... | 264/24 |
| 4,748,796 | 6/1988 | Viel ........................................... | 53/411 |
| 4,755,245 | 7/1988 | Viel .......................................... | 156/227 |
| 5,112,552 | 5/1992 | Wittmann et al. ....................... | 264/255 |
| 5,160,686 | 11/1992 | Thaler et al. ............................ | 264/255 |
| 5,257,491 | 11/1993 | Royer et al. ............................ | 53/428 |

FOREIGN PATENT DOCUMENTS

| | | |
|---|---|---|
| 0 258 086 | 10/1990 | European Pat. Off. . |
| 0 469 564 | 2/1992 | European Pat. Off. . |
| 0 557 573 A2 | 2/1992 | European Pat. Off. ........... C08J 5/18 |
| 0 412 867 | 9/1993 | European Pat. Off. . |
| 2544654 | 10/1984 | France . |
| 2801618 | 1/1988 | France . |
| 31 38 222 | of 0000 | Germany . |
| OS 3234065 | of 0000 | Germany . |
| 2 248 046 | 4/1974 | Germany . |
| 36 25 358 | 12/1975 | Germany . |
| 86 28 513.0 | 1/1987 | Germany . |
| 87 10 132.7 | 10/1987 | Germany . |
| 48-103635 | 12/1973 | Japan . |
| WO 94/01330 | 7/1992 | WIPO ............................ B65B 63/08 |
| WO 94/13451 | 6/1994 | WIPO . |

OTHER PUBLICATIONS

"Nordson Hot Melt Continuous Coating System", 1992, Bulletin, Nordson Corporation, Amherst, Ohio.

*Primary Examiner*—E. Rollins Buffalow
*Attorney, Agent, or Firm*—Ellen T. Dec

[57] ABSTRACT

Hot melt adhesive masses are provided with a tackless surface by a process which comprises the steps of: a) extruding the hot melt adhesive through an appropriate die orifice; b) spraying the surface of the extruded adhesive with a molten film forming low molecular weight polymer or formulated polymeric material, the material being selected so that it will not appreciably detract from the properties of the adhesive composition when remelted therewith; c) heating the surface of the coated adhesive at a temperature and for a period of time sufficient to re-melt the film forming polymer so as to form a continuous coating thereof yet insufficient to appreciably melt the adhesive; and d) cooling the thus coated adhesive mass to a temperature suitable for handling.

6 Claims, 1 Drawing Sheet

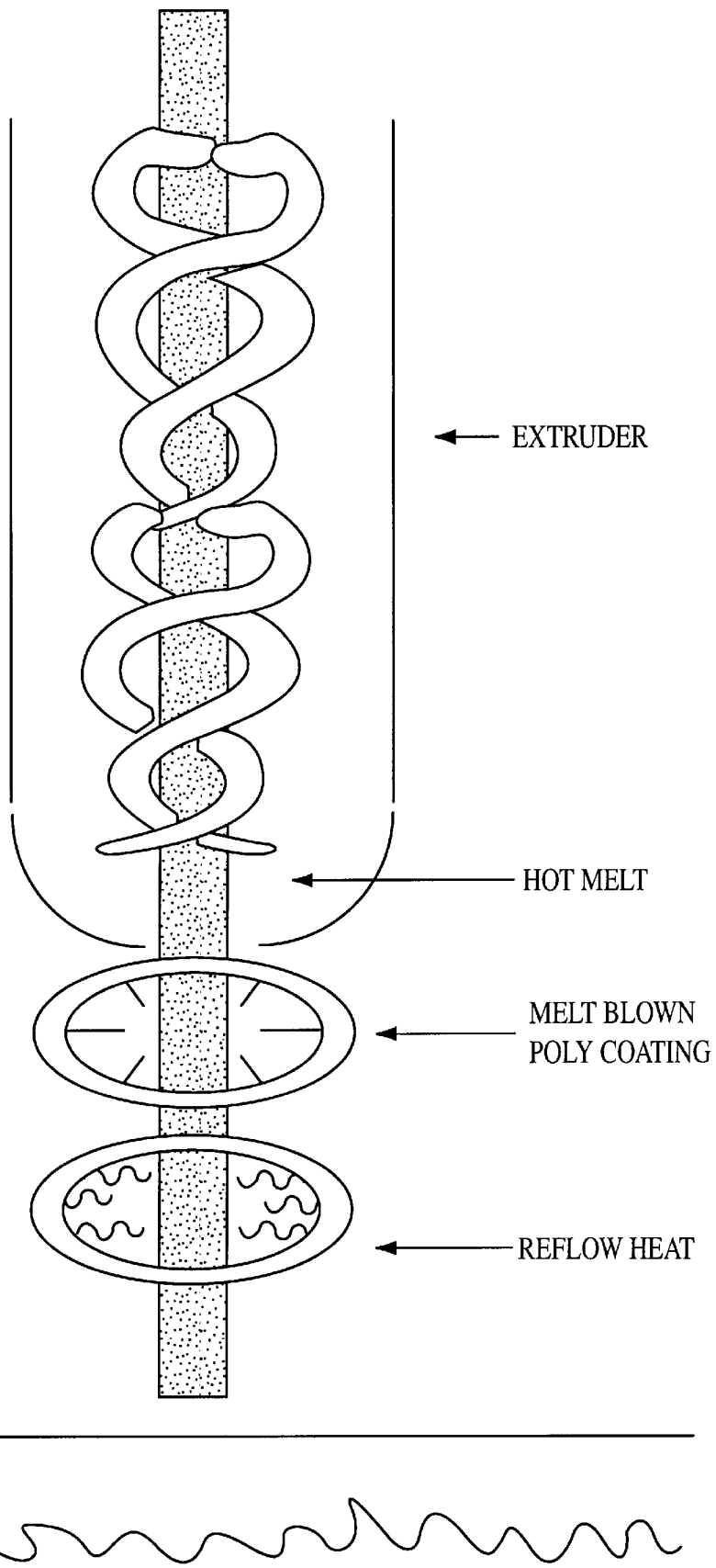

PROCESS FOR COATING HOT MELT ADHESIVES

This application is a continuation of application Ser. No. 08/269,462, filed Jun. 30, 1994, now abandoned.

BACKGROUND OF THE INVENTION

This invention relates to a method for coating hot melt adhesives compositions to provide tack free surfaces.

Hot melt adhesives which are generally applied while in the molten or liquid state are solid at room temperature. Typically, these adhesives are provided in the form of blocks and because of the nature of these materials, particularly the pressure sensitive hot melts, there are problems associated with handling and packaging them. The solid adhesive blocks not only stick or adhere to hands or mechanical handling devices and to each other, but they also pick up dirt and other contaminants. Additionally, certain applications which require high tack formulations result in blocks that will deform or cold flow unless supported during shipment. The need and advantages for providing tackless or non-blocking hot melt adhesives are apparent and various ways of accomplishing this have been developed.

Japanese Patent 48-103635 published Dec. 26, 1973, discloses a granular adhesive which is tacky at room temperature and coated or enveloped with a non-tacky hot meltable material that is the same type or is miscible or mixable with it.

French Patent 2,544,654 published Oct. 26, 1984, discloses forming a tackless hot melt by adding molten hot melt to a mold containing a preformed support layer having a transfer film thereon which is compatible with the hot melt.

U.S. Pat. Nos. 4,748,796 issued Jun. 12, 1988, and 4,755,245 issued Jul. 5, 1988, disclose forming a protective coating for an adhesive material by electrostatically coating a mold or cavity with a powder screen and then pouring hot melt into the mold.

French Patent 2,601,616 published Oct. 22, 1988, discloses forming blocks of hot melt pressure sensitive adhesives by casting the pressure sensitive adhesive into molds precoated by spraying with a film of non self-sticking hot melt material thereby forming a fusible non-tacky veil around the pressure sensitive block.

In German Patent 22 48 046 and U.S. Pat. 4,054,632 the hot melt adhesive is squeeze-cut into pillow-shaped pieces; the pieces subsequently cooled and solidified.

European Patent 412,867 published Feb. 13, 1991, discloses a process for coating hot melt adhesives with a compatible anti-adhesive agent, the coating being done at a temperature higher than its softening point.

Still other processes involve the coextrusion of a sheath surrounding the hot-melt material where the coextruded material may be, for example, polyethylene or a non-self-adhesive "hot-melt" compatible with the formulation of the extruded product.

SUMMARY OF THE INVENTION

In accordance with the present invention, hot melt adhesive masses are provided with a tackless surface by a process which comprises the steps of:

a) extruding the hot melt adhesive through an appropriate die orifice;

b) spraying the surface of the extruded adhesive with a molten film forming low molecular weight polymer or formulated polymeric material, the material being selected so that it will not appreciably detract from the properties of the adhesive composition when remelted therewith;

c) heating the surface of the coated adhesive at a temperature and for a period of time sufficient to re-melt the film forming polymer so as to form a continuous coating thereof yet insufficient to appreciably melt the adhesive; and d) cooling the thus coated adhesive mass to a temperature suitable for handling.

BRIEF DESCRIPTION OF THE DRAWINGS

The invention is illustrated by the accompanying FIGURE. In the FIGURE, 1 represents the extruder, 2 the extruder screw(s), 3 the hot melt adhesive, 4 the spray of the polymeric coating, 5 the heat treatment and 6 the cooling water bath.

DETAILED DESCRIPTION OF THE PREFERRED EMBODIMENT

The method of the present invention is adaptable to the packaging of virtually any type of hot melt adhesive composition. As examples the method disclosed herein may be used to package hot melt adhesives prepared from polymers and copolymers of synthetic resins, rubbers, polyethylene, polypropylene, polyurethane, acrylics, vinyl acetate, ethylene vinyl acetate and polyvinyl alcohol. More specific examples include hot melt adhesives prepared from the following:

a. rubber polymers such as block copolymers of monovinyl aromatic hydrocarbons and conjugated diene, e.g., styrene-butadiene, styrene-butadiene-styrene, styrene-isoprene-styrene, styrene-ethylene-butylene-styrene and styrene-ethylene propylene-styrene;

b. ethylene-vinyl acetate polymers, other ethylene esters and copolymers, e.g., ethylene methacrylate, ethylene n-butyl acrylate and ethylene acrylic acid;

c. polyolefins such as polyethylene and polypropylene;

d. polyvinyl acetate and random copolymers thereof;

e. polyacrylates;

f. polyamides;

g. polyesters;

h. polyvinyl alcohols and copolymers thereof;

i. polyurethanes;

j. polystyrenes;

k. polyepoxides;

l. graft copolymers of vinyl monomer(s) and polyalkylene oxide polymers; and m. aldehyde containing resins such as phenol-aldehyde, urea-aldehyde, melamine-aldehyde and the like.

Most often such adhesives are formulated with tackifying resins in order to improve adhesion and introduce tack into the adhesive. Such resin include, among other materials, (a) natural and modified resins, (b) polyterpene resins, (c) phenolic modified hydrocarbon resins, (d) coumaroneindene resins, (e) aliphatic and aromatic petroleum hydrocarbon resins, (f) phthalate esters and (g) hydrogenated hydrocarbons, hydrogenated rosins and hydrogenated rosin esters.

Desirable optional ingredients include diluents, e.g., liquid polybutene or polypropylene, petroleum waxes such as paraffin and microcrystalline waxes, polyethylene greases, hydrogenated animal, fish and vegetable fats, mineral oil and synthetic waxes as well as hydrocarbon oils such as naphthionic or paraffinic mineral oils.

Other optional additives may include stabilizers, antioxidants, colorants and fillers. The selection of components and amounts as well as the preparation thereof are well known in the art and described in the literature.

The adhesives to be treated in accordance with the invention are generally melt blended in a mixer/extruder and then extruded through an appropriately sized orifice while still at a temperature above the softening point of the adhesive. The die in the orifice may be of any conventional configuration and generally are such as to provide either a slat-like or cord-like configuration.

As the hot melt adhesive is extruded, it is spray coated with the film forming material. Any non-tacky film forming material which has a relatively low molecular weight and which will be compatible with, and not appreciably detract from the properties of, the adhesive when remelted may be utilized herein. In general, we have found that the most satisfactory materials have a viscosity less than 10,000 cps, and preferably less than 2000 cps., at the temperature at which they are sprayed (e.g., about 350° F.) Suitable film-forming materials include, for example, (a) cracked linear low density polyethylene such as Eastman's Epolene C-10, (b) high melt index ethylene vinyl acetate (8–28% vinyl acetate) copolymer such as Elvax 410 (18% vinyl acetate) or Elvax 205 (28% vinyl acetate), both from Du Pont and (c) ethylene iso-butylene copolymers such as DP 8910 from Shell (6% ethylene). Due to the high molecular weight of these polymers and resultant higher relative viscosity, increased re-flow temperatures are required making these polymers more useful in the packaging of higher softening point products. For this reason it is often beneficial to use formulated materials which are based on even higher molecular weight polymers such as A-B-A block copolymers, most commonly of the type where A is styrene and B is isoprene or butadiene or hydrogenated derivatives thereof; lower melt index ethylene vinyl acetate; or higher molecular weight low melt index polyethylene and polyamides; which polymers are then formulated with tackifying resins, waxes, plasticizers and other non-tacky agents which serve to lower the coating viscosity and improve the barrier function of the coating.

The coating step may be performed directly from the extruder while the adhesive is still at a relatively elevated temperature or the adhesive extrudate may be cooled and subsequently coated with the non-tacky material. Due to the difficulty in handling the uncoated adhesive mass, coating directly from the extruder is preferred.

The material is sprayed at a rate sufficient to provide a coating of 0.5 to 10 mils, preferably 1 to 3 mils thickness. In order to achieve a relatively uniform spray pattern, it is preferred to use equipment which is capable of coating the entire circumference of the extrudate in one step. Suitable equipment for such spray application of 100% solid material is available from Nordson.

Subsequent to the spray coating, it is an essential feature of the invention that the coated adhesive be subjected to a heating operation wherein the exterior film forming material is exposed to temperatures in excess of its melting point so it will reflow and provide a uniform coated surface. In so doing, it is also important that the heating temperature and time not substantially interfere with the configuration of the adhesive core material. In general, flash heating at temperatures of 350° to 500° F. for periods of time of 1 to 10 seconds is preferred. This step may also be carried out using the Nordson coating equipment.

Following the reheating step, the coated adhesive mass is then cooled for handling. The mass could be allowed to cool under ambient conditions, however it is preferred that the cooling occur in a water bath or in a refrigerant medium such as chilled glycol, liquid or gaseous nitrogen, compressed carbon dioxide or the like.

The coated extrudate can be cut mechanically into desired size portions using conventional equipment such as water jet, laser, or hot knife, if desired in conjunction with a voider roll.

The resultant coated hot melt adhesive may be further packaged in a container to reduce its exposure to the environment, moisture or other contaminants. The container or other wrappings would then be removed by conventional procedures prior to utilization of the hot melt adhesive.

EXAMPLE

The adhesive raw materials are compounded in a conventional twin screw extruder (length/diameter ratio of 30:1 to 50:1). From the extruder die head, the material is filtered through a 75 micron screen pack at a temperature of 180° C.±30° C. The molten material is fed to a gear pump which pumps the material through a tube into a shell heat exchanger to lower the temperature to a point at which it can be shaped. The material is then pushed through a circular die having an internal diameter approximately the size of the desired package. The formed material is then passed vertically through the Nordson container coating system in order to apply a coating of approximately 3 mils to the hot melt adhesive. The coated material is then reheated to reflow for a period of about 2 seconds. In the case of formulated coatings prepared from a molten blend of 35% Escorez 5320 (Exxon), 15% Kraton G 1652 (Shell), 10% Kraton 1657 (Shell), and 40% paraffin wax, reflow occurs at about 375° F. If a coating comprising 40% Elvax 260 (Du Pont), 40% paraffin wax and 20% Wingtac Extra (Goodyear) is used, temperatures of about 450° F. are need to reflow.

The resultant coated hot melt adhesive package is passed through voider rolls and cut into appropriate size segments which are then cooled in a water bath to ensure adequate solidification of the internal core material.

This process provides hot melt adhesives having a continuous tack free coating which can be added directly to the melt pot and will remelt and be readily incorporated into the molten hot melt for application through conventional equipment including narrow orifice spray equipment.

We claim:

1. A process for providing hot melt adhesive masses with a tackless surface comprising the steps of:
   a) extruding the hot melt adhesive through an appropriate die orifice;
   b) spraying the surface of the extruded adhesive with a molten film forming polymeric material, the material being selected so that it will not detract from the properties of the adhesive composition when remelted therewith when such remelted adhesive is applied through narrow orifice spray equipment;
   c) heating the surface of the coated adhesive at a temperature and for a period of time sufficient to re-melt the film forming polymer so as to form a continuous coating thereof yet insufficient to melt the adhesive;
   d) cooling the thus coated adhesive mass to a temperature suitable for handling; and
   e) subsequently remelting the coated adhesive mass.

2. The process of claim 1 wherein the film-forming material is selected from the group consisting of cracked linear low desity polyethylene, high melt index ethylene vinyl acetate copolymers containing 8 to 28% vinyl acetate, and ethylene iso-butylene copolymers.

3. The process of claim 1 wherein the film-forming material is selected from the group consisting of A-B-A block copolymers, lower melt index ethylene vinyl acetate copolymers and higher molecular weight low melt index polyethylene and polyamides which polymers are further formulated with tackifying resins, waxes, plasticizers and other non-tacky agents which serve to lower the coating viscosity and improve the barrier function of the coating.

4. The process of claim 1 wherein the film-forming material is applied by spraying in an amount sufficient to provide a coating of 0.5 to 10 mils.

5. The process of claim 1 wherein the heating operation is carried out by flash heating at a temperature of 350° to 500° F. for 1 to 10 seconds.

6. A process for providing hot melt adhesive masses with a tackless surface comprising the steps of:

a) extruding the hot melt adhesive through an appropriate die orifice;

b) spraying the surface of the extruded adhesive with a molten film forming polymeric material, the material being such that it will not detract from the properties of the adhesive composition when remelted therewith and being selected from the group consisting of cracked linear low density polyethylene, high melt index ethylene vinyl acetate copolymers containing 8 to 28% vinyl acetate, ethylene iso-butylene copolymers, A-B-A block copolymers, lower melt index ethylene vinyl acetate copolymers and higher molecular weight low melt index polyethylene and polyamides which polymers are further formulated with at least one of a member selected from the group consisting of tackifying resins, waxes, and plasticizers;

c) heating the surface of the coated adhesive at a temperature and for a period of time sufficient to re-melt the film forming polymer so as to form a continuous coating thereof yet insufficient to melt the adhesive when said remelted adhesive is applied through narrow orifice spray equipment;

d) cooling the thus coated adhesive mass to a temperature suitable for handling; and e) subsequently remelting the coated adhesive mass.

* * * * *